United States Patent Office 3,394,113
Patented July 23, 1968

3,394,113
PROCESS FOR THE PREPARATION OF
POLYMERIC MERCAPTOESTERS
Walter Clarence Snyder, Freeport, Tex., assignor to The Dow Chemical Company, Midland, Mich., a corporation of Delaware
No Drawing. Filed Aug. 29, 1966, Ser. No. 575,546
18 Claims. (Cl. 260—79.5)

This invention relates to a process for the preparation of polymeric mercaptoesters. Further, this invention relates to a process for preparing a polymercapto esterified copolymer. Still further, this invention relates to a process for the preparation of vinylidene addition polymers containing pendant mercapto groups. Also, this invention provides a method for modifying a surface coating such as a paint, lacquer, or latex which contains free carboxyl groups by adding thereto a monomeric substituted thiirane to produce mercapto groups, thereby making a coating having exceptional durability to polymer degradation caused by exposure to heat and light.

It is known how to prepare mercaptoesters of a vinyl acid. However, the art teaches that the monomeric alkylene sulfides act as chain transfer agents when used in normal persulfate-peroxide catalyzed vinylidene polymerizations, and lead to incomplete polymerization and extremely low molecular weight polymers which are unsatisfactory for most uses.

It has now been discovered that mercaptoester polymers of high molecular weight, e.g., with molecular weights in excess of 100,000, can be prepared which have properties superior to the extremely low molecular weight polymers known in the art. The polymeric mercaptoesters prepared by the method of this invention are extremely useful in protecting surface coatings against degradation due to heat and light.

My invention provides a process for preparing a high molecular weight polymeric mercaptoester, or a polymercapto esterified copolymer, which comprises first copolymerizing an olefinic carboxylic acid with a monoethylenically unsaturated monomer having a single vinylidene group, followed by esterification of the copolymer with a monomeric substituted thiirane having the general formula:

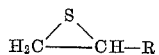

wherein R is an alkyl group containing from 1 to 4 carbon atoms, to form the polymercaptoester copolymer.

It is important that the starting copolymer of an olefinic acid and a vinylidene compound first prepared according to the method of my invention contains from 0.5 to 25, and preferably from 0.5 to 5, percent by weight of carboxylic acid monomer based on the total weight of the monomers in the copolymer. At least 0.5 percent by weight of acid monomer is necessary in order to react with the substituted thiirane to form a polymer with pendant mercapto groups which impart good light stability and weatherability to the polymer when used as a coating.

However, in preparing a latex polymer by emulsion polymerization, at least one percent by weight of acid monomer based on the total weight of monomers in the starting copolymer is necessary to impart stability to mechanical shear and freeze-thaw cycles of the latex by the reaction of free carboxyl groups with ammonium hydroxide or other basic material in the alkaline medium to form a salt.

Thus, in the case of a mercaptoester latex polymer, at least 1.5 percent by weight of acid monomer is necessary in the starting copolymer. However, where freeze-thaw is no problem, such as in preparing an organic solution polymer or lacquer, the acid monomer level in the starting copolymer could be as low as 0.5 percent by weight.

It is usually preferable to use methacrylic acid, acrylic acid, or mixtures of these acids as monomers containing a carboxylic group to prepare the carboxylic polymer. On the other hand, other carboxylic acids can be used which are olefinically unsaturated and which possess one or more olefinic linkage and one or more carboxyl groups. The carboxylic acid must contain at least one activated double bond of a type which easily reacts in a polymerization by addition. In other words, the acid in question has to contain either: (1) a double bond in the position alpha-beta with relation to a carboxyl group (—CH=CH—COOH); or (2) a vinylidene group wherein the double bond is attached to a terminal methylene grouping ($CH_2$=C<).

The following monomer acids constitute examples of acids belonging to group (1): crotonic acid, angelic acid, hydrosorbic acid, cinnamic acid, m-chlorocinnamic acid, p-chlorocinnamic acid, alpha-cyano cinnamic acid, ubellic acid and other mono-olefinic monocarboxylic acids; sorbic acid, alpha-methyl sorbic acid, alpha-ethyl sorbic acid, alpha-chloro sorbic acid, alpha-methyl gamma benzal crotonic acid, beta-(2-butenyl) acrylic acid, 2,4-heptadienoic acid, 2,4-pentadienoic acid, 2,4,6-octatrienoic acid, 1 - carboxyl - 1 - ethyl-4-phenylbutadiene-1,3 acid, 2,6-dimethyl decatriene-(2,6,8)oic-10-acid, alpha-beta isopropylidene propionic acid, alpha-vinyl cinnamic acid, alpha-isopropenylfurfural acetic acid, alpha-isopropenyl-cinnamenyl acrylic acid and other monocarboxylic polyolefinic acids; hydromuconic acid, glutaconic acid, maleic acid, fumaric acid and other mono-olefinic polycarboxylic acids; 3-carboxy-pentadiene-(2,4)-oic-1 acid, muconic acid and other polyolefinic polycarboxylic acids.

The following monomer acids constitute examples of compounds belonging to group (2): acrylic acid, alpha-chloroacrylic acid, methacrylic acid, ethacrylic acid, alpha-isopropylidene acrylic acid, alpha-styryl acrylic (2-carboxy-4-phenyl butadiene-1,3) acid, beta-vinyl acrylic (1-carboxy butadiene-1,3) acid, alpha-vinyl acrylic acid, beta-acryloxy propionic acid, itaconic acid, as well as other acids. It is preferable to use a mono carboxylic monoolefinic acid whose double bond is situated in the alpha-beta position with regard to the carboxyl group and which contains a terminal methylene group.

Copolymerized with the olefinic unsaturated acid is a monoethylenically unsaturated monomer copolymerizable therewith, containing a single active terminal vinylidene group which undergoes addition polymerization to produce linear polymers. The monomer is present in the starting carboxylic copolymer in the amount of 75 to 99.5, and preferably from 95 to 99.5, percent by weight based on the total weight of monomers in the starting copolymer. In preparing a latex polymer by emulsion polymerization, however, the monomer may be present only in an amount up to 98.5 percent by weight based on the total weight of monomers.

Particularly suitable monoethylenically unsaturated monomers are vinyl aromatic compounds such as styrene, vinyl toluene, alpha-methyl styrene and the halostyrenes, having a single vinyl group and free of other substituents capable of reacting with an unsaturated acid, i.e., monofunctional vinyl aromatic compounds. Also valuable are saturated alcohol esters of acrylic, methacrylic, and crotonic acids. Examples of monofunctional vinyl aromatic monomers are isopropenyl toluene, the various dialkyl, styrenes, ortho-, meta- and para-chloro styrene, bromo styrenes, fluoro styrenes, cyano styrenes, vinyl naphthalene, the various alpha-substituted styrenes, e.g., alpha-methyl styrenes, alpha-methyl para-methyl styrenes, as well as various di-, tri- and tetra-chloro, bromo and fluoro styrenes. Acrylic, methacrylic and crotonic esters of saturated alcohols include the methyl, ethyl, propyl, isopropyl, n-butyl, isobutyl, (sec)butyl, (tert.)butyl, amyl, hexyl, heptyl, octyl, decyl or dodecyl esters of acrylic, methacrylic, and crotonic acids. Thus, preferred monomers include alpha-beta unsaturated monocarboxylic acid esters of saturated monohydric alcohols, the acids having not more than four carbon atoms and the alcohols having not more than twenty carbon atoms, and monofunctional vinyl aromatic compounds.

Other known monoethylenically unsaturated monomers can, of course, be used in the preparation of the carboxyl-containing vinyl copolymer. Desirable monomers include vinyl aliphatic cyanides of not more than four carbon atoms, for example, acrylonitrile and methacrylonitrile, as well as monovinyl ethers, e.g., ethyl vinyl ether, ethyl methallyl ether, vinyl butyl ether, methyl vinyl ether and others of not over twenty carbon atoms. Included also are unsaturated monohydric alcohol esters of saturated monobasic acids wherein the alcohols contain a single vinyl group and the acids have not more than twenty atoms, for instance, vinyl acetate, vinyl stearate, and the allyl, methallyl, and crotyl esters of propionic, butyric and other acids. Not only the monomers themselves, but mixtures of the monomers can be copolymerized with the olefinic unsaturated acids to form the carboxyl-containing vinyl copolymer.

Substituted thiiranes which can be used in the practice of this invention include propylene sulfide or 1,2-epithiopropane, butylene sulfide or 1,2-epithiobutane, pentylene sulfide or 1,2-epithiopentane, hexylene sulfide or 1,2-epithiohexane.

At least 0.5 percent by weight of a substituted thiirane based on the total weight of monomers must be reacted with the starting copolymer in order to esterify the carboxyl groups contained therein. This will result in a polymer having good light stability and weatherability which are essential qualities for use as a coating. Not more than one mole of substituted thiirane should be reacted per mole equivalent of carboxyl group. Preferably however, from 0.7 percent to 4.0 percent by weight of substituted thiirane based on the total weight of monomers should be used.

The starting carboxylic copolymer used in the practice of this invention may be obtained by polymerization in emulsion, suspension, mass, or a coil reactor such as described in U.S. Patent 2,769,804. Ordinarily an emulsion polymerization is used to prepare the carboxylic copolymer in latex form. In such case, the emulsion is usually comprised of the mixture of monomers, appropriate emulsifiers or surfactants, and a free radical generating catalyst such as potassium persulfate, sodium persulfate, or ammonium persulfate. The polymerization temperatures usually vary from 20° to 90° C.

This carboxylic copolymer can be obtained with any molecular weight which adapts itself to the envisaged use for the final product; this molecular weight can go up to 100,000 and frequently higher.

It is contemplated that by the method of this invention, the polymerization of the starting carboxylic copolymer with the substituted thiirane can be carried out in a water suspension to produce a latex, a water solution, an organic solvent (lacquer), or a molten mass.

When the polymerization is carried out in a water suspension, it is important that the suspension be first rendered mildly alkaline, i.e., a pH of at least 7 and below 10, by adding ammonia, a water-soluble amine, an inorganic base such as potassium hydroxide, or a mixture thereof. The purpose for this being that the base converts the acid to a salt that is capable of catalyzing the ring opening of the thiirane and is sufficiently volatile to disassociate from the acid thereby allowing the mercaptoester formation. Organic bases which can be used are morpholine, piperidine, pyrrolidine, triethanolamine, dimethylethanolamine, ethanolamine, propanolamine, diethanolamine, or the like, particularly amines of molecular weights not over 150. A combination of an organic base and ammonia is often particularly useful. Ammonia, usually giving the best results in the simplest way, is preferred.

In the method of my invention, a polymerization temperature range of from 20° to 90° C. is generally satisfactory.

Compositions prepared according to the present invention may contain any of the additives normally present in surface coatings such as antioxidants and coloring materials.

The following examples illustrate ways in which the principle of the invention has been applied but are not to be construed as limiting its scope.

EXAMPLE I

Into a 5 liter, 5 neck reaction flask equipped with an agitator, reflux condenser, inert gas purge line, dropping funnel, thermometer and a Variac controlled heating mantle there was added:

| | Grams |
|---|---|
| Deionized water | 2000.0 |
| Benax 2A1 (45% active) (surfactant: a sodium salt of dodecyldiphenyl ether of disulfonic acid | 20.0 |
| Dowfax 9N10 (surfactant: a nonylphenolethylene oxide adduct having about 10 moles of ethylene oxide condensed per mole of nonylphenol) | 5.0 |
| $K_2S_2O_8$ (potassium persulfate) | 5.0 |

The reactor was purged with nitrogen gas and the temperature allowed to rise to 80° C. while adding the following mixture of monomers to the dropping funnel:

| | Grams |
|---|---|
| Styrene monomer | 900.0 |
| Methacrylic acid monomer | 100.0 |

When the temperature reached 80° C. the monomer mix was added continuously over a one hour interval. The temperature was raised slowly to about 87° C. Further heating was carried out for an additional two hours. The resultant latex was cooled to room temperature and filtered to storage. The latter had a solids content of 33.0 percent and a pH of 3.0 A sample of the latex was dried and a thin film was formed by molding in a heated press at 165° C. and 30,000 p.s.i. This film was then scanned by infra red and a spectrum was drawn.

EXAMPLE IA 2000.0 grams of the latex prepared in Example I were added to a clean 5 liter, 5 neck reaction flask equipped as heretofore described. The latter was heated to 70° C. The pH was raised to 8.5 with 28 percent ammonium hydroxide. 2000.0 grams of latex at 33.0 percent solids equals 660.0 grams of solids, assuming all the monomer polymerized. There was 66.0 grams of methacrylic acid polymer distributed throughout the polymer chains. The molecular weight of monomeric methacrylic acid is 87, thus the polymer contained 0.7585 gram mole of acid. Thereafter, there was weighed out 74×0.7585=56.2 grams of monomeric propylene sulfide or one mole of thiirane per mole equivalent of carboxyl group. The propylene sulfide was added to the dropping funnel and added dropwise into the reactor. After addition was complete, the temperature was maintained at 70° C. for one hour. The reactor was cooled to room temperature and the latex was filtered to storage. The solids content of the latex was 35 percent. A sample of the polymer was dried, and then molded into a thin film (see previous description in Example I). The film was then scanned by infra red and the spectra before and after addition of propylene sulfide was compared. The before spectrum had an absorption at 3.8, indicating acid. No ester was seen in the spectrum. The after spectrum contained a trace of acid salt and gave an excellent ester absorption at 5.8, indicating the formation of the mercaptopropyl methacrylate.

EXAMPLE II

A film of wet latex from Example IA (before the propylene sulfide addition) was cast on a glass plate and the water was allowed to evaporate. 20.0 grams of the dried polymer was dissolved in 100.0 grams of toluene with stirring at 70° C. There was added 1.0 gram of monomeric propylene sulfide; after one hour a sample of the lacquer was cast on a glass plate and the solvent and unreacted propylene sulfide allowed to evaporate. The resulting polymer deposit was scraped up and molded in a press at 165° C. and 30,000 p.s.i. This film was scaned by infra red, and the spectrum obtained therefrom was compared with the spectrum of Example I. The film of Example II had no acid group absorption, but had a good ester band showing, thus indicating formation of mercapto propyl ester.

The above examples were prepared and evaluated primarily for analytical determination to prove the process and products obtained therefrom. The following examples were prepared to illustrate the utility of the process and the improved stability of the polymer compositions.

EXAMPLE III

The same procedure as in Example I was employed utilizing the following compositions:

Water phase: Grams
- Water (deionized) _____ 1650.0
- Benax 2A1 (45%) a surfactant: a sodium salt of dodecyldiphenyl ether of disulfonic acid) _____ 15.0
- Dowfax 9N40 (surfactant: a nonylphenol-ethylene oxide adduct having about 40 moles of ethylene oxide condensed per mole of nonylphenol) _____ 80.0
- $K_2S_2O_8$ _____ 4.5

Monomer phase:
- Ethyl acrylate _____ 1000.0
- Methyl methacrylate _____ 470.0
- Methacrylic acid _____ 15.0
- Acrylic acid _____ 15.0

Reaction temperature—75° C.
Feed time—3 hours
Digestion time—2 hours

The resultant polymer had a molecular weight of 158,000 by solution viscosity. The resultant latex had a pH of 2.3, and a solids content of 47.0 percent. The pH was adjusted to 8.5 with 28 percent ammonium hydroxide. The latex was cast as a film on bleached sulfite paper then air dried for about 18 hours, and when exposed to a fadeometer the film exhibited the following properties:

| | Gloss | Tack | Flexibility |
|---|---|---|---|
| Hours Exposure: | | | |
| 200 | Moderate gloss | Slight | Good. |
| 400 | Very glossy | Trace | Do. |
| 600 | 10% Penetration | None | Moderate stiffening. |
| 800 | 25% Penetration | do | Brittle. |
| 1,000 | 40% Penetration | do | Do. |

EXAMPLE IV 2000.0 grams of the latex, described in Example III, was added to a clean 5 liter, 5 neck reaction flask equipped as previously described. The latex was heated to 70° C. and 7.0 grams of propylene sulfide were added to the dropping funnel and added dropwise into the reactor. After the addition was complete the temperature was maintained at 70° C. for one hour. The reactor was cooled to room temperature and the latex was filtered to storage. The resultant latex was cast as a film on bleached sulfite paper then air dried for about 18 hours and exposed to a fadeometer. The film exhibited the following properties:

| | Gloss | Tack | Flexibility |
|---|---|---|---|
| Hours Exposure: | | | |
| 200 | Moderate gloss | Slight | Good. |
| 400 | do | do | Do. |
| 600 | do | do | Do. |
| 800 | do | do | Do. |
| 1,000 | do | do | Do. |

I claim:

1. A process for preparing a mercaptoester polymer which comprises, first copolymerizing from 0.5 to 25 percent by weight based on the total weight of monomers in the copolymer of an olefinic unsaturated carboxylic acid or mixture thereof with from 75 to 99.5 percent by weight based on the total weight of monomers in the copolymer of a monoethylenically unsaturated monomer or mixture thereof having a single active terminal vinylidene groups which undergoes addition polymerization, and then esterifying said copolymer with at least 0.5 percent by weight based on the total weight of monomers of a substituted thiirane having the general formula:

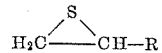

wherein R is an alkyl group containing from one to four carbon atoms, said thiirane being present in an amount no greater than one mole of thiirane per mole equivalent of carboxyl group.

2. A process according to claim 1, wherein the mercaptoester polymer is prepared in latex form by first, copolymerizing in a water suspension from 1.5 to 25 percent by weight based on the total weight of monomers of said carboxylic acid or mixture thereof with from 75 to 98.5 percent by weight based on the total weight of monomers of said monoethylenically unsaturated monomer or mixture thereof, and then adjusting the pH of the resultant latex to a value between 7 and 10, prior to esterifying the copolymer with said thiirane.

3. A process according to claim 1, wherein said carboxylic acid is methacrylic acid.

4. A process according to claim 1, wherein said carboxylic acid is acrylic acid.

5. A process according to claim 1, wherein said carboxylic acid is a mixture of acrylic acid and methacrylic acid.

6. A process according to claim 1, wherein said monoethylenically unsaturated monomer is styrene.

7. A process according to claim 1, wherein said monoethylenically unsaturated monomer is a mixture of ethyl acrylate and methyl methacrylate.

8. A process according to claim 1, wherein said substituted thiirane is propylene sulfide.

9. A process according to claim 1, wherein the esterification is carried out in an organic solvent medium.

10. A process according to claim 2, wherein said carboxylic acid is methacrylate acid.

11. A process according to claim 2, wherein said carboxylic acid is acrylic acid.

12. A process according to claim 2, wherein said carboxylic acid is a mixture of acrylic acid and methacrylic acid.

13. A process according to claim 2, wherein said monoethylenically unsaturated monomer is styrene.

14. A process according to claim 2, wherein said monoethylenically unsaturated monomer is a mixture of ethyl acrylate and methyl methacrylate.

15. A process according to claim 2, wherein said substituted thiirane is propylene sulfide.

16. A mercaptoester polymer prepared according to the process of claim 1.

17. A mercaptoester polymer latex prepared according to the process of claim 2.

18. A mercaptoester polymer having a molecular weight of 100,000 or more, comprising, a copolymer of from 0.5 to 25 percent by weight based on the total weight of monomers in the copolymer of an olefinic unsaturated carboxylic acid or mixture thereof and from 75 to 99.5 percent by weight based on the total weight of monomers in the copolymer of a monoethylenically unsaturated monomer or mixture thereof having a single active terminal vinylidene groups which undergoes addition polymerization, said copolymer being esterified with at least 0.5 percent by weight based on the total weight of monomers in the copolymer of a substituted thiirane having the general formula:

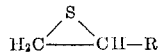

wherein R is an alkyl group containing from one to four carbon atoms, but not more than one mole of said thiirane per mole equivalent of carboxyl group.

References Cited

UNITED STATES PATENTS 2,962,457   11/1960   Mackinney _____ 260—79.5
3,268,494   8/1966   Herbert _____ 260—79.7
3,342,770   9/1967   Osborn _____ 260—79.5

JOSEPH L. SCHOFER, *Primary Examiner.*

D. K. DENENBERG, *Assistant Examiner.*